(12) United States Patent
Yamanaka et al.

(10) Patent No.: US 6,751,105 B2
(45) Date of Patent: Jun. 15, 2004

(54) METHOD FOR CONTROLLING PWM PULSE

(75) Inventors: Katsutoshi Yamanaka, Fukuoka (JP); Eiji Watanabe, Fukuoka (JP); Takaaki Terada, Fukuoka (JP); Yoshiyuki Tanaka, Fukuoka (JP); Yuuichi Terazono, Fukuoka (JP)

(73) Assignee: Kabushiki Kaisha Yasakawa Denki, Fukuoka (JP)

( * ) Notice: Subject to any disclaimer, the term of this patent is extended or adjusted under 35 U.S.C. 154(b) by 0 days.

(21) Appl. No.: 10/204,662

(22) Filed: Nov. 18, 2002

(65) Prior Publication Data

US 2003/0137857 A1 Jul. 24, 2003

(30) Foreign Application Priority Data

Feb. 28, 2000 (JP) .................................... 2000-051506

(51) Int. Cl.$^7$ .......................... H02M 1/12; H02P 1/54
(52) U.S. Cl. ................................. 363/41; 318/801
(58) Field of Search ............... 363/16, 17, 40, 363/41, 56.01, 56.02, 97, 98, 131, 132; 318/798–803, 805, 806, 812, 814

(56) References Cited

U.S. PATENT DOCUMENTS

| | | | | | |
|---|---|---|---|---|---|
| 5,355,297 A | * | 10/1994 | Kawabata et al. | ............ | 363/43 |
| 5,552,977 A | * | 9/1996 | Xu et al. | ............ | 363/41 |
| 6,281,656 B1 | * | 8/2001 | Masaki et al. | ............ | 318/700 |
| 6,560,130 B2 | * | 5/2003 | Oba et al. | ............ | 363/97 |

* cited by examiner

Primary Examiner—Matthew V. Nguyen
(74) Attorney, Agent, or Firm—Katten Muchin Zavis Rosenman

(57) ABSTRACT

For an interval in which an Op-vector and a b-vector are successively output among intervals of output voltage vectors of each phase within a PWM cycle, the output times of each vector are divided by a positive integer m to find divided times of each vector, and the Op-vector and the b-vector are each alternately output for the divided time, each vector being output m times. For an interval in which an On-vector and an a-vector are successively output, the output times of each vector are divided by a positive integer n to find divided times of each vector, and the On-vector and a-vector are each alternately output for the divided time, each vector being output n times. The adoption of this method enables dispersion of the frequency component of current ripple that arises from PWM pulses (1)–(3).

16 Claims, 13 Drawing Sheets

(a)

(b)

METHOD FOR CONTROLLING PWM PULSE

TECHNICAL FILED

The present invention relates to a pulse width modulation (hereinbelow abbreviated "PWM") pulse control method in a power converter such as an inverter that implements system interconnection or variable-speed drive of a motor that is load, and more particularly to a PWM pulse control method for realizing lower noise of an inverter that performs three-phase drive.

BACKGROUND ART

We refer first to FIG. 1, which is a circuit diagram showing the configuration of a three-phase two-level PWM inverter. As shown in FIG. 1, a three-phase two-level PWM inverter is composed of dc power supply 101, capacitor 102, U-phase, V-phase, and W-phase output terminals 117–119 of a motor, semiconductor switching elements (for example, IGBT and GTO) 103–108, and diodes 109–114.

When semiconductor switching elements 103, 105, and 107 are turned ON, output terminals 117–119 for each phase are connected to positive bus 115, which leads from the positive electrode of the dc power supply, and the output phase voltage of each phase becomes a high level (hereinbelow abbreviated "H"). When semiconductor switching elements 104, 106, and 108 are turned ON, output terminals 117–119 for each phase are connected to negative bus 116, which leads from the negative electrode of the dc power supply, and the output phase voltage of each phase becomes a low level (hereinbelow abbreviated "L").

Modulation methods for such a three-phase two-level PWM inverter include a three-phase modulation method and a two-phase modulation method. The three-phase modulation method realizes modulation by varying the voltage levels of all three phases. The two-phase modulation method realizes modulation by fixing the output phase voltage of one of the three phases to the high level (H) or low level (L) and then modulating the remaining two phases. In the two-phase modulation method, the fixed phase is switched by the phase of the output phase voltage.

In such a three-phase two-level PWM inverter, the two-phase modulation method is generally used when the modulation percentage and output frequency of the inverter are both high, and the three-phase modulation method is generally used when the modulation percentage and output frequency are low.

Since pulses of three phases are output at the same time in the three-phase modulation method, the width of PWM pulses can be made longer than in the two-phase modulation method. When the modulation percentage and the output frequency of the inverter are both low, the time interval in which the output voltage vector is a zero vector increases and the width of the PWM pulses of each phase therefore decreases.

Since the switching of the semiconductor switching elements cannot be followed when the width of the PWM pulses becomes too small, the three-phase modulation method, in which the PWM pulse width is greater, is employed when the output frequency of the inverter is low.

As for the prior-art PWM pulse control method of a PWM inverter in which the three-phase modulation method is employed, the phase state when output terminals 117–119 for each phase are connected to positive bus 115 is referred to as the first state (hereinbelow abbreviated "P"), and the phase state when output terminals 117–119 are connected to negative bus 116 is referred to as the second state (hereinbelow abbreviated "N"). Further, when the output states of the three phases in the order of U-phase, V-phase, and W-phase is (P, P, P), the output voltage vector is the Op-vector, and when the output states of the three phases is (N, N, N), the output voltage vector is the On-vector. The output voltage vector is the a-vector when the output states are (P, N, N), (N, P, N), and (N, N, P); and the output voltage vector is the b-vector when the output states are (P, P, N), (N, P, P), and (P, N, P). The a-vector is the output voltage vector when any one phase of the three phases is P, and the b-vector is the output voltage vector when any one phase of the three phases is N.

We now refer to FIG. 2, which is a timing chart showing the PWM pulse control method of the prior art. Triangular wave voltage 4 is the PWM carrier signal of the PWM inverter. Voltage commands 5–7 indicate voltage commands of the W-phase, the V-phase, and the U-phase, respectively. PWM pulse 1 of the U-phase, PWM pulse 2 of the V-phase, and PWM pulse 3 of the W-phase are shown beneath the signal and commands. The output terminals of each phase are connected to positive bus 115 and the output state of each phase is P when PWM pulses 1–3 are H; and the output terminals of each phase are connected to negative bus 116 and the output states of each phase is N when PWM pulses 1–3 are L. Since the cycle of voltage commands 5–7 is extremely long, the values of voltage commands 5–7 show virtually no fluctuation within a single cycle of triangular-wave voltage 4.

In the PWM pulse control method of the prior art, PWM pulses 1–3 are each L when the value of triangular wave voltage 4 exceeds the value of each of the respective voltage commands 5–7, and PWM pulses 1–3 are each H when the value of triangular wave voltage 4 falls below each of the respective values of voltage commands 5–7. In this case, the output voltage vectors undergo transitions within one cycle of triangular wave voltage 4 in the order: Op-vector-b-vector-a-vector-On-vector-a-vector-b-vector-Op-vector.

We next refer to FIG. 3, which is a circuit diagram showing the constitution of a three-phase three-level PWM inverter. As shown in FIG. 3, a three-phase three-level PWM inverter is made up by: dc power supply 201; capacitors 202 and 203; U-phase, V-phase, and W-phase output terminals 117–119 of a motor; neutral point 252, semiconductor switching elements 230–241, and diodes 204–221.

When semiconductor switching elements 230 and 231, 234 and 235, and 238 and 239 are turned ON, output terminals 117–119 of each phase are connected to positive bus 250 and the output phase voltage of each phase becomes H. When semiconductor switching elements 231 and 232, 235 and 236, and 239 and 240 are turned ON, output terminals 117–119 of each phase are connected to neutral point 252 and the output phase voltage of each phase becomes an intermediate level between H and L (hereinbelow abbreviated "M"). When semiconductor switching elements 232 and 233, 236 and 237, and 240 and 241 are turned ON, output terminals 117–119 of each phase are connected to negative bus 251 and the output phase voltage of each phase becomes L.

The three-phase three-level PWM inverter modulation method described in the foregoing explanation includes unipolar modulation and dipolar modulation. Unipolar modulation is a mode in which PWM pulses are output in which the output level of the output phase voltage is repeatedly H and M when the voltage command value is a positive value, and PWM pulses are output in which the output level of the output phase voltage is repeatedly M and L when the voltage command value is a negative value. Dipolar modulation is a mode in which a PWM pulse is output in which the output level of the output phase voltage repeatedly alternates between H and L on either side of M within one cycle of the PWM carrier signal regardless of whether the voltage command value is negative or positive.

In such a three-phase three-level PWM inverter, unipolar modulation is generally used when the output frequency and modulation percentage are both high, and dipolar modulation is generally employed when output frequency and modulation percentage are both low. This is because one side of the semiconductor switching elements repeatedly switch between ON and OFF over a long time period if unipolar modulation is used when the output frequency is low, raising the danger of breakdown of these semiconductor switching elements.

Explanation next regards the prior-art PWM pulse control method for a PWM inverter in which dipolar modulation is employed. The state of each phase when output terminals 117–119 of each phase are connected to positive bus 250 is P, the state of each phase when output terminals 117–119 of each phase are connected to negative bus 251 is N, and the state of each phase when output terminals 117–119 of each phase are connected to neutral point 252 is a third sate (hereinbelow referred to as "O").

Further, the output voltage vector is the Op-vector when the output state of the three phases in the order of U-phase, V-phase, and W-phase is (P, P, P); the output voltage vector is the On-vector when the output state is (N, N, N); and the output voltage vector is the Oo-vector when the output state is (O, O, O). The output voltage vector is the ap-vector when the output state is (P, O, O), (O, P, O), or (O, O, P); the output voltage vector is the an-vector when the output state is (O, N, N), ((N, O, N) or (N, N, O); the output voltage vector is the bp-vector when the output state is (P, P, O), (O, P, P), or (P, O, P); and the output voltage vector is the bn-vector when the output state is (O, O, N), (N, O, O) or (O, N, O).

FIG. 4 is a timing chart showing the dipolar modulation PWM pulse control method of the prior art. This chart shows the output state of each phase of a three-phase motor within one cycle Tc of triangular voltage 4, which is the voltage of the PWM carrier signal. Voltage commands 5–7 represent the voltage commands of the W-phase, V-phase and U-phase, respectively.

FIG. 4 shows PWM pulses of each phase 1–3 in the prior art in one cycle of triangular wave voltage 4 of the prior-art PWM pulse control method. As shown in FIG. 4, within one cycle of triangular wave voltage 4, the output voltage vector undergoes transitions in the order: Op-vector-bp-vector-ap-vector-Oo-vector-bn-vector-an-vector-On-vector; or in the opposite order.

In the above-described PWM inverter, current flows to specific semiconductor switching elements over a long period when the output frequency is extremely low, and a method has therefore been proposed by which the cycle of the PWM carrier signal is lengthened to reduce the number of instances of switching and thus decrease switching loss. However, lowering the frequency of the PWM carrier signal also lowers the frequency of the ripple component of current that flows to the motor, and this results in the problem that, of the frequency components of sound that is produced by the ripple component of the current, frequency components that are within the spectrum of human hearing are increased.

As described above, when the output frequency is low in a PWM inverter of the prior art, the frequency of the PWM carrier signal is set low, whereby the instances of switching by semiconductor switching elements are decreased to reduce the switching loss and prevent breakdown of semiconductor switching elements. However, lowering the frequency of the PWM carrier signal raises the problem that the frequency of the ripple component of the current that flows to the motor is also lowered, whereby, of the frequency components of sound that is produced by the ripple component of the current, the frequency component that is within the spectrum of human hearing is increased.

DISCLOSURE OF INVENTION

It is an object of the present invention to provide a PWM pulse control method in which, of the frequency components of sound that is produced by current ripple, the frequency component that is within the spectrum of human hearing is not increased even when the frequency of a PWM carrier signal is set to a low level.

To achieve the above-described object in the PWM pulse control method of the present invention, when the output frequency of a three-phase two-level inverter is set low and the frequency of a PWM carrier signal is also set low, PWM pulses are generated in which the output times of the output voltage vectors of each phase are divided by a first set value and a second set value. Adopting this method enables the frequency of current ripple, which is a ripple component that is caused by PWM pulses that are contained in the current that flows to the load, to differ for each phase, whereby the frequency component of the current ripple that is caused by PWM pulses can be dispersed. As a result, of the frequency components of sound that is produced by current ripple, the frequency component that is within the spectrum of human hearing can be prevented from reaching a high level.

In an embodiment of the PWM pulse control method of the present invention, when the PWM pulses are too short and the switching of semiconductor switching elements cannot be performed effectively because the divided times resulting from the first set value and second set value are short, a smaller value is set by the first set value and the second set value to decrease the number of divisions of each vector. The divided times can thus be lengthened and switching of the semiconductor switching elements can therefore be performed smoothly.

In an embodiment of the PWM pulse control method of the present invention, the entire ON-delay correction amount of PWM pulses is an ON-delay correction amount that is calculated based on the first set value and second set value that are determined when seeking the divided times of each vector and is the sum of a first ON-delay correction amount and second ON-delay correction amount. Adopting this form enables ON-delay correction of PWM pulses that is free of overcompensation and that accords with the number of instances of switching of semiconductor switching elements of an actual inverter, and therefore enables correction, without overcorrection or undercorrection, of distortion that arises from ON-delay in the output current of an inverter.

Further, in an embodiment of the PWM pulse control method of the present invention, PWM pulses are divided based on a PWM pulse to which has been added a first ON-delay correction amount for which the first set value and second set value are calculated as 1. Adopting this form enables division of PWM pulses using a PWM pulse that is close to the PWM pulses that are actually output to an inverter.

In an embodiment of the PWM pulse control method of the present invention, the cycle of the PWM carrier signal is lengthened with increase in the first and second set values. Adopting this form can prevent the PWM pulse width from becoming shorter than necessary, and as a result, switching of semiconductor switching elements can be carried out smoothly.

In another PWM pulse control method of the present invention, when the output frequency of a three-phase neutral-point clamping inverter and the frequency of the PWM carrier signal are both set to low levels, the output times of the output voltage vectors of each phase are divided by first, second, third, and fourth set values and PWM pulses then generated. By adopting this form, the frequency of current ripple, which is a ripple component arising from PWM pulses that are contained in current that flows to a load, differs for each phase and the frequency components of current ripple that arises from PWM pulses can be dispersed, whereby, of the frequency components of sound that is produced by current ripple, frequency component within the spectrum of human hearing can be prevented from reaching a high level.

In an embodiment of the PWM pulse control method of the present invention, when PWM pulses become too short due to the shortness of divided times resulting from the first, second, third, and fourth set values and switching of semiconductor switching elements cannot be performed effectively, a small value is set by means of the first, second, third, and fourth set values to decrease the number of divisions of each vector. Adopting this method enables lengthening of the divided times of each vector, whereby switching of the semiconductor switching elements can be performed smoothly.

In an embodiment of the PWM pulse control method of the present invention, the entire ON-delay correction amount of PWM pulses is an ON-delay correction amount that is calculated based on the first, second, third, and fourth set values that are determined when finding the divided times of each vector and is the sum of a first and a second ON-delay correction amounts. Adopting this form enables ON-delay correction of PWM pulses without overcompensation or undercompensation in accordance with the number of instances of switching of semiconductor switching elements of an actual inverter. As a result, the PWM pulse control method of the present invention enables correction without excess or deficiency of distortion of the output current of an inverter that is caused by ON-delay.

In an embodiment of the PWM pulse control method of the present invention, PWM pulses are divided based on a PWM pulse to which has been added a first ON-delay correction amount that is calculated with the first set value and second set value as 1. Adopting this form enables division of PWM pulses using PWM pulses that are close to the PWM pulses that are actually output to an inverter.

Finally, in an embodiment of a PWM pulse control method of the present invention, the cycle of the PWM carrier signal is made longer than the current cycle with increase in the first, second, third, and fourth set values. Adopting this form can prevent the PWM pulse width from becoming shorter than is necessary, whereby switching of semiconductor switching elements can be performed smoothly.

BEST MODE FOR CARRYING OUT THE INVENTION

Figure 1:
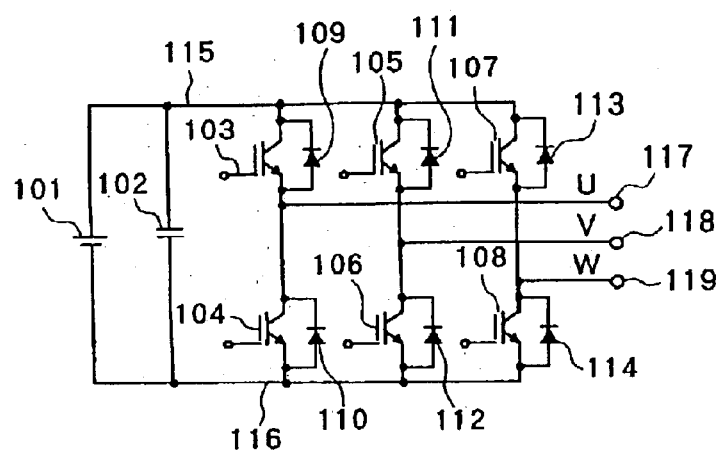
FIG. 1 is an equivalent circuit showing the construction of a three-phase two-level PWM inverter.
Figure 2:
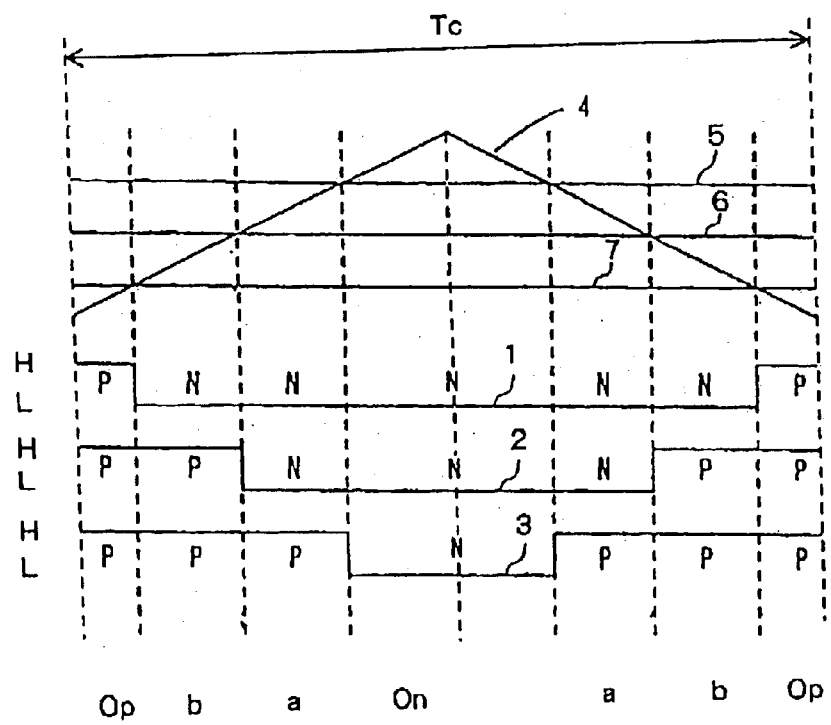
FIG. 2 is a timing chart illustrating a PWM pulse control method of the prior art in a three-phase two-level PWM inverter.
Figure 3:
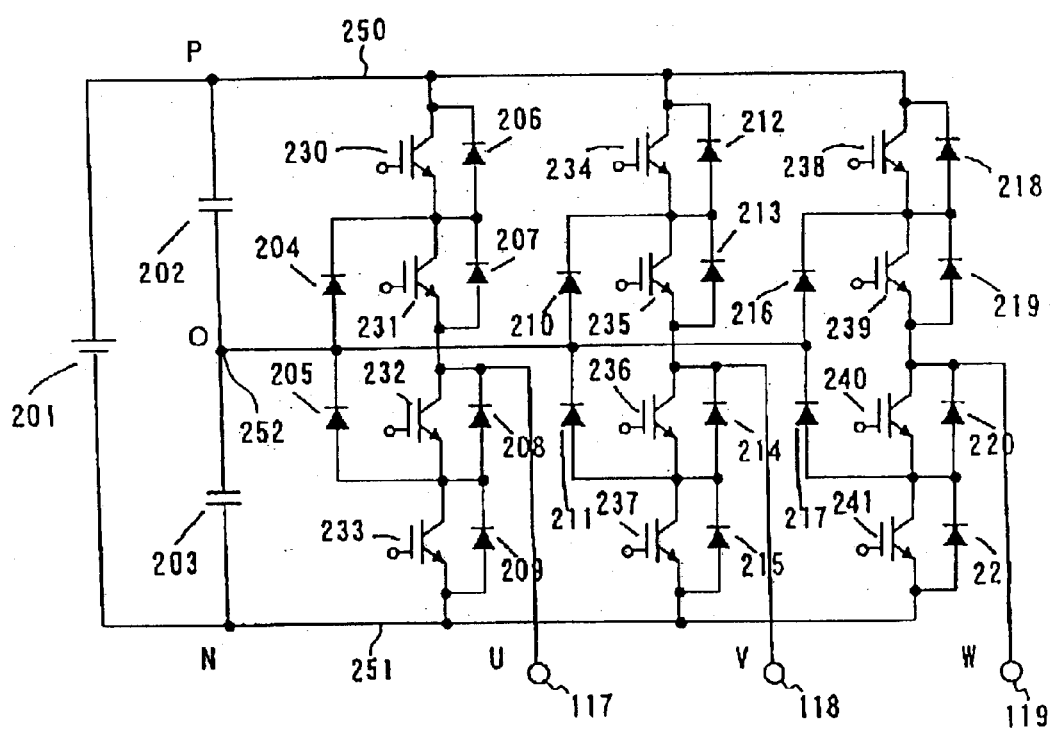
FIG. 3 is an equivalent circuit showing the construction of a three-phase three-level PWM inverter.
Figure 4:
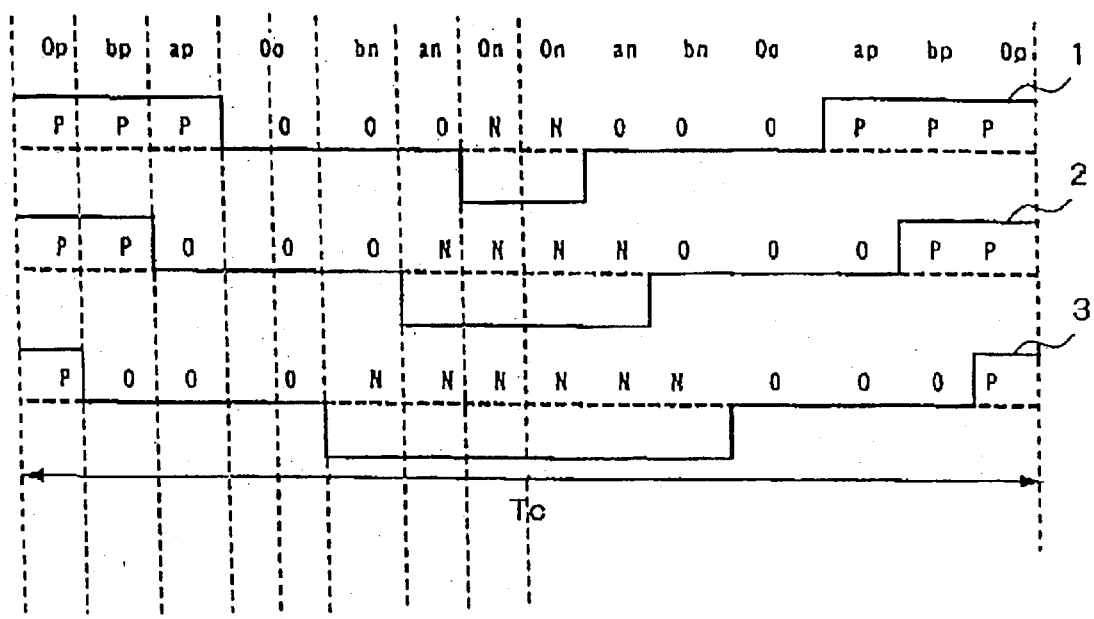
FIG. 4 is a timing chart showing a PWM pulse control method of the prior art in a three-phase three-level PWM inverter.

Preferable embodiments of the present invention are next explained with reference to the accompanying figures. In each of the figures, identical reference numerals indicate identical constituent elements.

First Embodiment

Referring first to FIGS. 5 to 9, details regarding the PWM pulse control method of the first embodiment of the present invention are explained. The PWM pulse control method of this embodiment is applied to a three-phase two-level PWM inverter such as shown in FIG. 1. In this three-phase two-level PWM inverter, three-phase modulation is adopted when the output frequency and modulation percentage are low.

Figure 5:
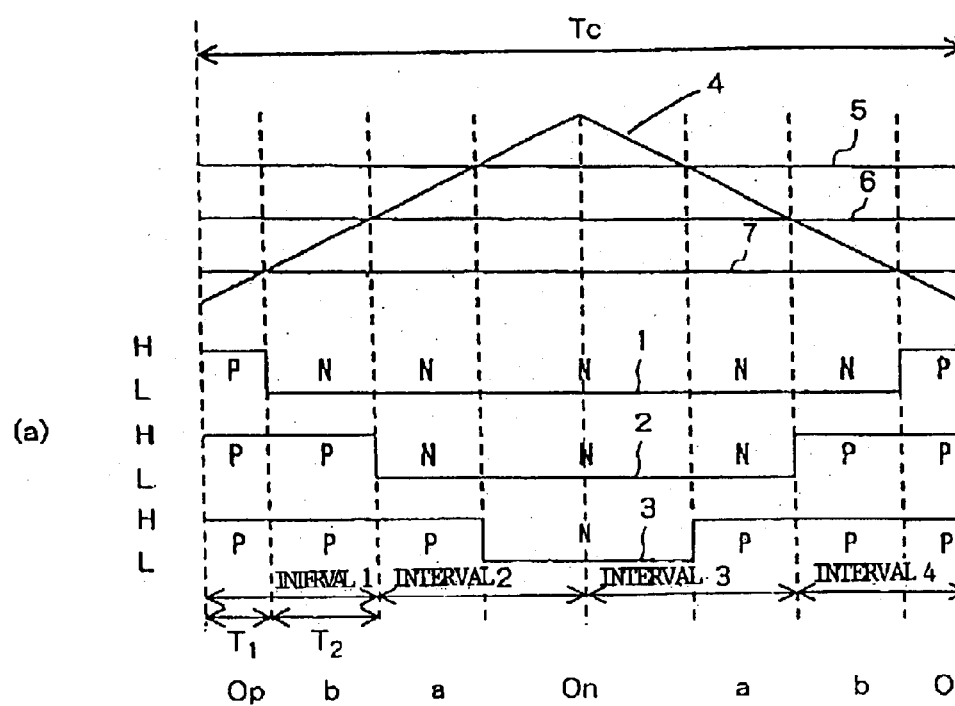
FIG. 5 is a timing chart showing the basic method in the PWM pulse control method of the first embodiment of the present invention.
Figure 5:
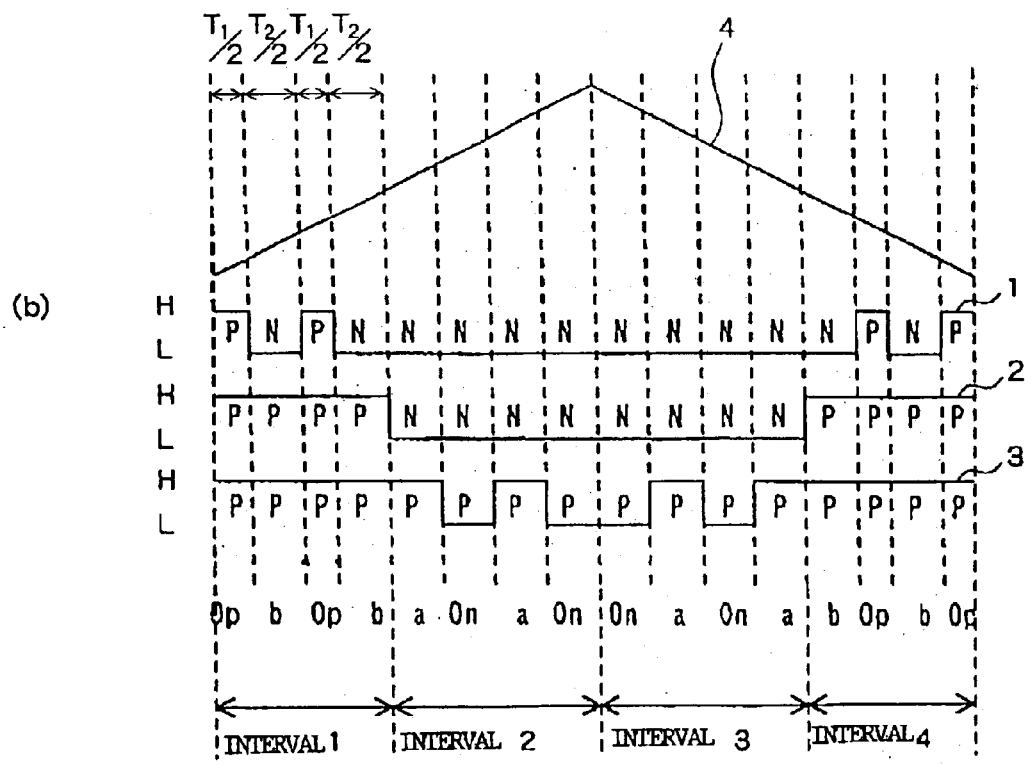

FIG. 5 is a timing chart showing the basic method of the PWM pulse control method of the present embodiment. As shown in FIG. 5(a), in the PWM pulse control method of this embodiment, the output order and output times of each vector are found when PWM pulses 1–3 are created, as with the PWM pulse control method of the prior art. The (Op-vector, b-vector) and (On-vector, a-vector) are next grouped, and the inside of one cycle Tc of triangular wave cycle 4 is divided into time intervals in which vectors in the same group are successively output.

In the first half of the cycle of triangular wave voltage 4, the interval in which the Op-vector and b-vector are first successively output is interval 1, and the interval in which the a-vector and the On-vector are successively output is interval 2. Next, in the second half of the cycle of triangular wave voltage 4, the interval in which the On-vector and a-vector are successively output is interval 3, and the interval in which the b-vector and Op-vector are successively output is interval 4.

In interval 1, the output time of the Op-vector is T1, and the output time of the succeeding b-vector is $T_2$. In the PWM pulse control method of the present embodiment, the Op-vector is output for first time $T_{1/2}$ in interval 1, and the b-vector is output for the succeeding time $T_{2/2}$. The Op-vector is then output for the succeeding time $T_{1/2}$, and the a-vector is output for the final time $T_{2/2}$. In other words, the output time of the Op-vector and the output time of the a-vector are each divided by two, and each vector is alternately output two times. The output times of each of the vectors is similarly divided into two for intervals 2, 3, and 4. In the PWM pulse control method of the present embodiment, as described in the foregoing explanation, the output time of each vector is divided, and PWM pulses 1–3 are generated in which each vector is alternately output for exactly the divided time, the number of times of output of a vector being equal to the number of divisions. The form of these PWM pulses 1–3 of each vector is shown in FIG. 5(*b*).

In the PWM pulse control method of the present embodiment, the output time of each vector may also be divided into 3 or 4 divisions. A positive integer must be designated as the number of divisions, and the number of divisions must be adjusted according to the frequency component of current ripple that is produced.

In the PWM pulse control method of the present embodiment, the sum of the widths of PWM pulses 1–3 within one cycle of triangular wave voltage 4 is the same as in the prior-art PWM pulse control method, and the output voltage of the inverter should ideally be the same as in the prior-art PWM pulse control method. In actuality, however, the output voltage of the inverter is influenced by the switching characteristics of semiconductor switching elements 103–108, and the output voltage in the PWM pulse control method of the present embodiment will therefore differ somewhat from that of the PWM pulse control method of the prior art. In the PWM pulse control method of the present embodiment, PWM pulses 1–3 are corrected with due consideration given to the switching characteristics of semiconductor switching elements 103–108 such that output voltage will be equal to that of the prior-art PWM pulse control method. This correction of PWM pulses 1–3 is realized by predicting the amount of correction based on the already known switching characteristics of semiconductor switching elements 103–108 and detecting divergence of the actual output voltage of the inverter.

Figure 6:
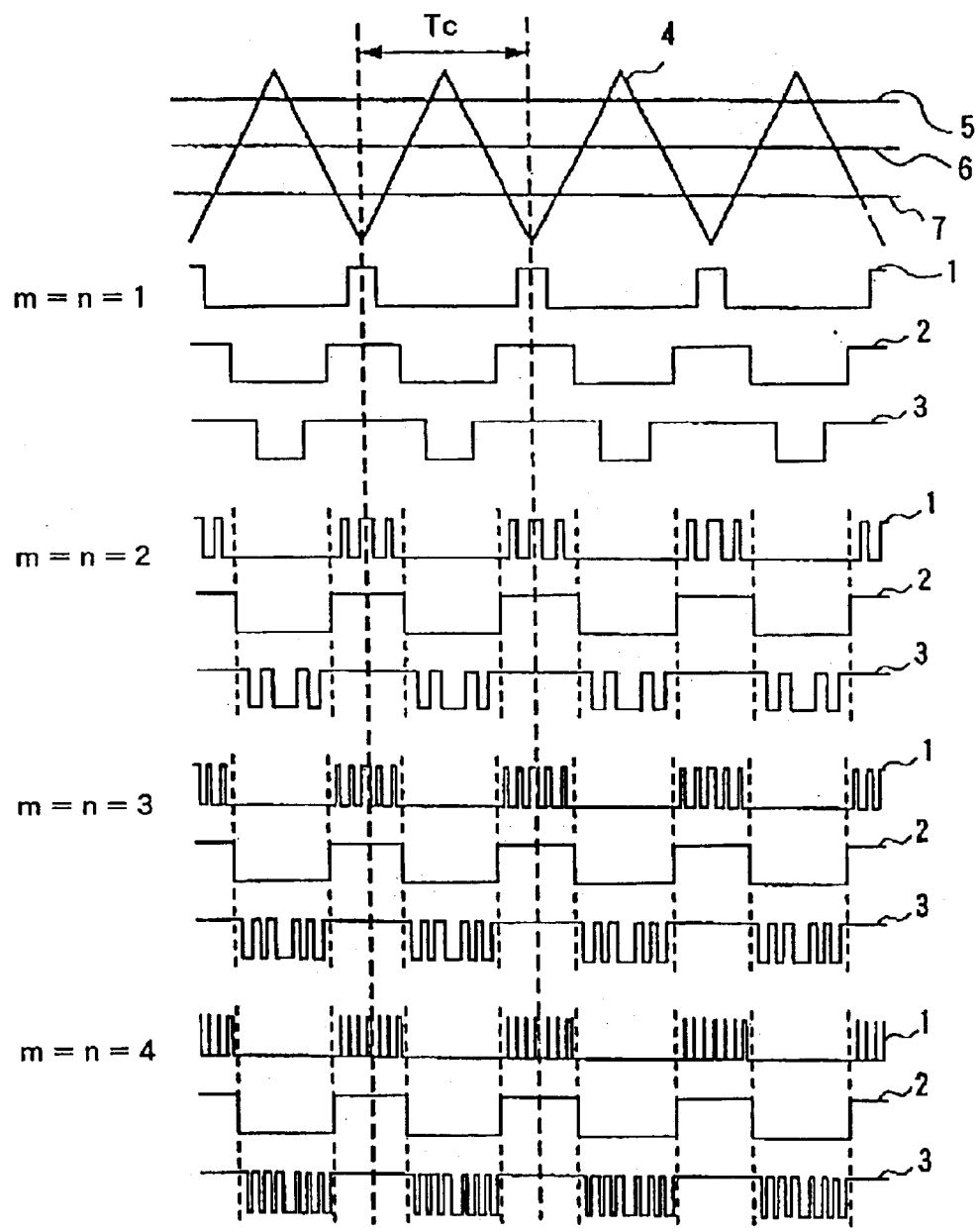
FIG. 6 is a timing chart showing the PWM pulse control method of the first embodiment of the present invention when changing the number of divisions.

FIG. 6 is a timing chart showing the PWM pulse control method of the present embodiment when the number of divisions is varied. As shown in FIG. 6, in the PWM pulse control method of the present embodiment, the output time of the Op-vector and the output time of the b-vector are divided into m divisions by means of first set value m, and the output time of the a-vector and the output time of the On-vector are divided into n divisions by means of second set value n. In FIG. 6, an example is shown in which m and n are equal, but m need not be equal to n.

The output times of the Op-vector, the On-vector, the a-vector, and the b-vector are determined by the phase angles and the modulation percentages of the output voltage vectors that are to be output by the inverter, and these output times therefore fluctuate widely. For example, when the values of the voltage commands of each phase are close, the output times of the a-vector and b-vector become short. When these output times are divided, the switching intervals of each of semiconductor switching elements 103–108 becomes too short and switching cannot be performed well. The relevant division value m or n is thereupon reduced such that the switching intervals of semiconductor switching elements 103–108 do not become too short.

When actually applying PWM pulses 1–3 as input to the three-phase two-level PWM inverter that is shown in FIG. 1, the upper and lower semiconductor switching elements of each phase in the inverter circuit must be kept from short-circuiting. Thus, when any of the upper or lower semiconductor switching elements is switched from OFF to ON, i.e., when any of PWM pulses 1–3 is switched from ON to OFF or from OFF to ON, the inverter must delay the set time that either the upper or the lower semiconductor switching element is switched from OFF to ON by a prescribed time interval. This prescribed time interval is referred to as "ON-delay time." However, when this switching of a semiconductor switching element from OFF to ON is delayed by a prescribed time interval, voltage cannot be output according to the voltage command and distortion is produced in the actual output current waveform of the inverter. The inverter therefore typically adds in advance to PWM pulses 1–3 an ON-delay correction amount to correct the divergence between the output voltage and the voltage command that occurs as a result of the effect of ON-delay time.

Figure 7:
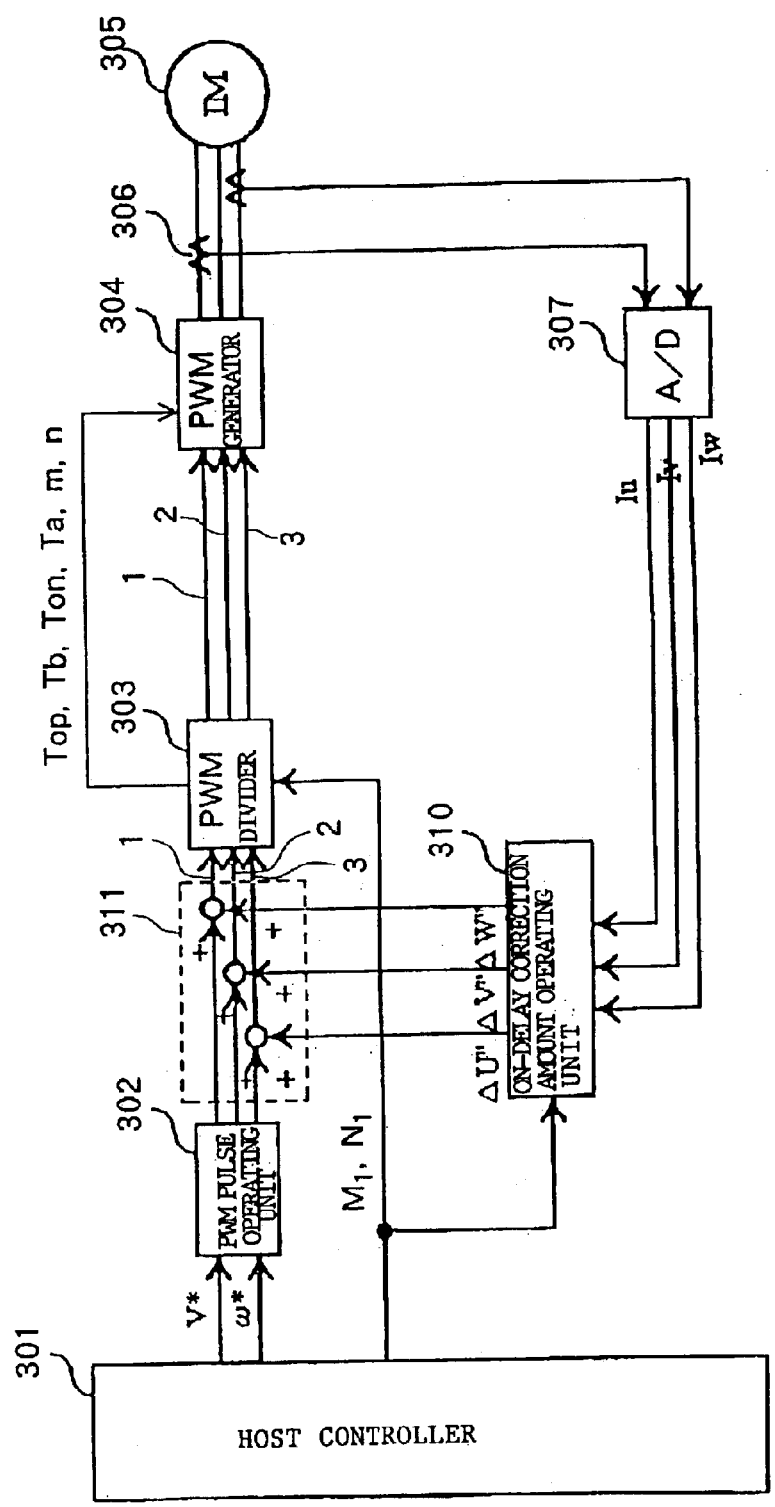
FIG. 7 is a block diagram showing the construction of a control circuit of an induction motor that uses the PWM pulse control method of the first embodiment of the present invention.

FIG. 7 is a block diagram showing the construction of a control circuit of an induction motor that uses the PWM pulse control method of the present embodiment. This control circuit is a circuit in which correction by the above-described ON-delay correction amount is taken into consideration. As shown in FIG. 7, the control circuit of induction motor 305 is provided with: host controller 301, PWM pulse operating unit 302, PWM divider 303, PWM generator 304 that includes the three-phase two-level PWM inverter shown in FIG. 1, current detector 306 such as a DCCT, A/D converter 307, and ON-delay correction amount operating unit 310.

Host controller 301 outputs initial value $M_1$ of first set value m, initial value $N_1$ of second set value n, and command signals, i.e., frequency command ω* and output voltage command V*.

PWM pulse operating unit 302 calculates the output times of each of the Op-vector, b-vector, a-vector, and On-vector in one cycle of PWM based on frequency command co* and output voltage command V* that have been output from host controller 301 and outputs PWM pulses of each phase 1–3 of induction motor 305 in one PWM cycle.

A/D converter 307 converts analog signals that indicate current values of each phase $I_u$, $I_v$, and $I_w$ of induction motor 305 that have been detected by means of current detector 306 to digital signals and outputs the result.

ON-delay correction amount operating unit 310 receives as input initial value $M_1$ of first set value m and initial value $N_1$ of second set value n that have been output from host controller 301 and the current values of each phase $I_u$, $I_v$, and $I_w$ of induction motor 305 that have been output from A/D converter 307, and calculates and outputs the PWM pulse ON-delay correction amounts of each phase Δ U", Δ V", and Δ W". The negative or positive attribute of the values of ON-delay correction amounts of each phase Δ U", Δ V", and ΔW" is determined by the direction of the current values of each phase $I_u$, $I_v$, and $I_w$ of induction motor 305, and the magnitude of these values is determined by the product of the ON-delay time that is necessary for one switching of a semiconductor switching element and the number of instances of switching of the semiconductor switching elements of each phase. This number of instances of switching increases or decreases in accordance with the number of divisions of each vector, and the number of divisions of each vector is determined by the initial value $M_1$ of first set value m and the initial value $N_1$ of second set value n.

Adder 311 adds ON-delay correction amounts of each phase ΔU", ΔV", and ΔW" to PWM pulses of each phase 1–3, respectively, that have been output from PWM pulse operating unit 302, and outputs the result.

PWM divider 303 takes as input initial value $M_1$ of first set value m and initial value $N_1$ of second set value n and PWM pulses of each phase 1–3 that have been output from adder 311, finds divided times by using first set value m and second set value n to divide the output times of each vector that are constituted by PWM pulses of each phase 1–3, and both outputs PWM pulses of each phase 1–3 to PWM generator 304 and outputs the divided times of each vector and the finally determined first set value m and second set value n to PWM generator 304.

Based on the received divided times of each vector and the finally determined first set value m and second set value n, PWM generator 304 divides PWM pulses of each phase 1–3, and, based on the divided PWM pulses, controls the inverter shown in FIG. 1 to drive induction motor 305.

Although ON-delay correction amounts ΔU", ΔV", and ΔW" are determined based on the direction of current values of each phase $I_u$, $I_v$, and $I_w$ of induction motor 305 in the PWM pulse control method of the present embodiment, the PWM pulse control method of the present invention is not limited to this form, and various methods may be applied for finding ON-delay correction amounts ΔU", ΔV", and ΔW".

Figure 8:
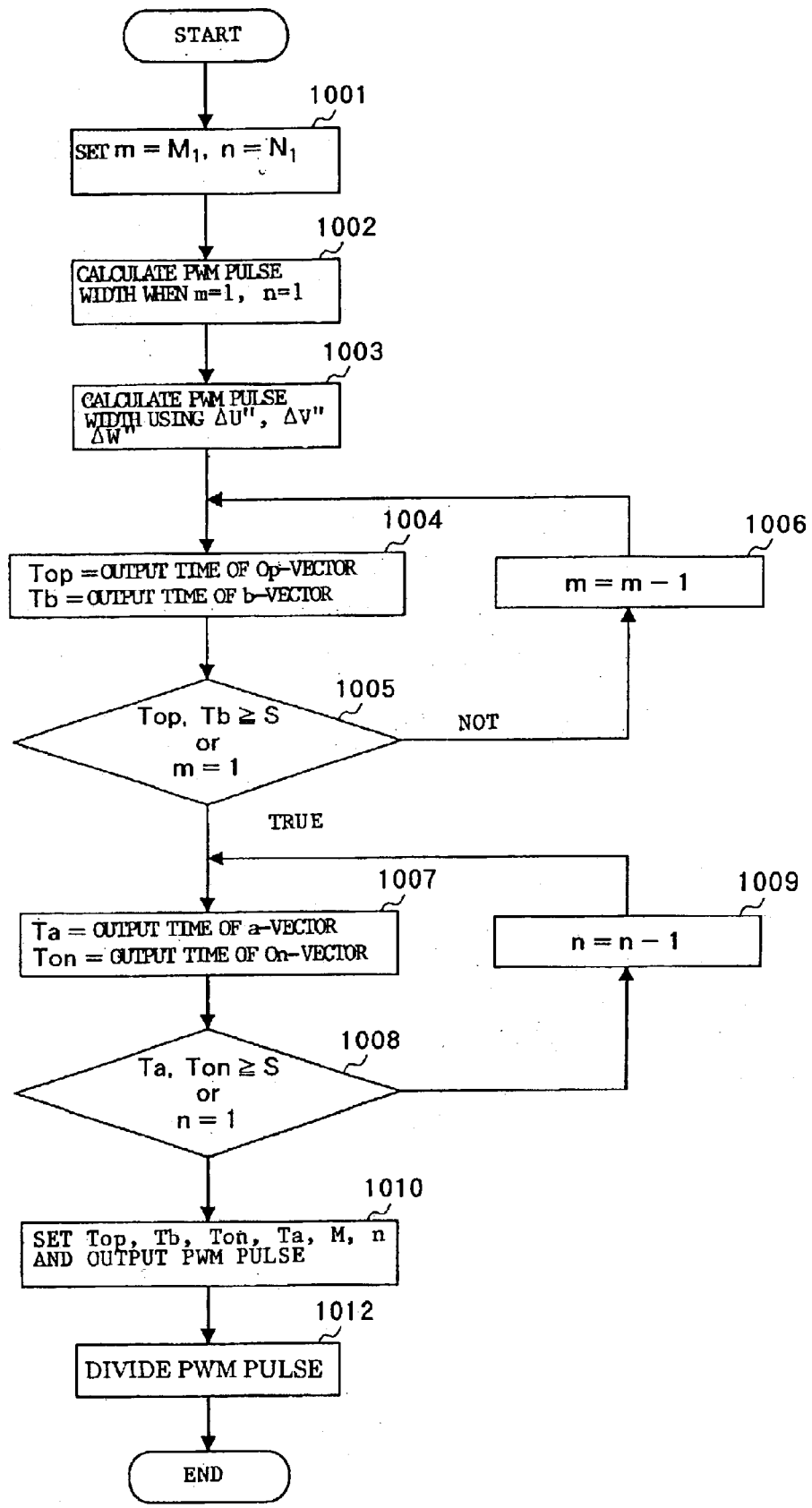
FIG. 8 is a flow chart showing the operation of the control circuit shown in FIG. 7.

We next refer to FIG. 8, which is a flow chart showing the operation of the control circuit of the above-described induction motor 305. Host controller 301 first outputs frequency command ω* and output voltage command V*, and further, sets first set value m and second set value n to initial value $M_1$ and initial value $N_1$, respectively, and outputs these values (Step 1001).

PWM pulse operating unit 302, based on frequency command ω* and output voltage command V* from host controller 101, calculates the PWM pulse width for each phase in one PWM cycle when the first set value m and second set value n are 1 and outputs PWM pulses 1–3 (Step 1002).

ON-delay correction amounts of each phase ΔU", ΔV", and ΔW" that have been output from ON-delay correction amount operating unit 110 are next added by means of adder 111 to PWM pulses of each phase 13 that have been output from PWM pulse operating unit 302, and the pulse widths of PWM pulses for each phase 1–3 are adjusted (Step 1003).

PWM divider 303 next receives as input PWM pulses of each phase 1–3 that have been adjusted in Step 1003, divides the output time of the Op-vector and the output time of the b-vector in these PWM pulses of each phase 1–3 into m divisions by first set value m, and calculates divided times Top and Tb for each vector (Step 1004).

PWM divider 303 next compares divided times Top and Tb with a prescribed value S and checks whether divided times Top and Tb are equal to or greater than a prescribed value S or whether first dividing value m is 1 (Step 1005).

If, in Step 1005, divided times Top and Tb are smaller than prescribed value S, and moreover, first set value m is not 1, first set value m is reduced by 1 (Step 1006) and the process returns to Step 1004.

If, in Step 1005, divided times Top and Tb are equal to or greater than prescribed value S, or first set value m is 1, PWM divider 303 divides the output time of the a-vector and the output time of the On-vector in the PWM pulses of each phase that were adjusted in Step 1003 by second set value n to calculate the divided times Ta and Ton of each vector (Step 1007).

PWM divider 303 next compares divided times Ta and Ton with a prescribed value S and checks whether divided times Top and Tb are equal to or greater than prescribed value S, or whether second dividing value n is 1 (Step 1008). If divided times Top and Tb are smaller than prescribed set value S, and moreover, second set value n is 1, second set value is reduced by 1 (Step 1009) and the process returns to Step 1007.

If, in Step 1008, divided times Top and Tb are equal to or greater than prescribed set value S, or if second set value n is 1, PWM divider 303 sets divided times Top, Tb, Ton and Ta that were found in Steps 1004 and 1007 and first and second set values m and n at that time in PWM generator 304, and further, outputs PWM pulses to PWM generator 304 (Step 1010). PWM generator 304 divides PWM pulses based on Top, Th, Ton, Ta, m, and n, and based on the divided PWM pulses, controls the inverter to drive induction motor 105 (Step 1012).

Figure 9:
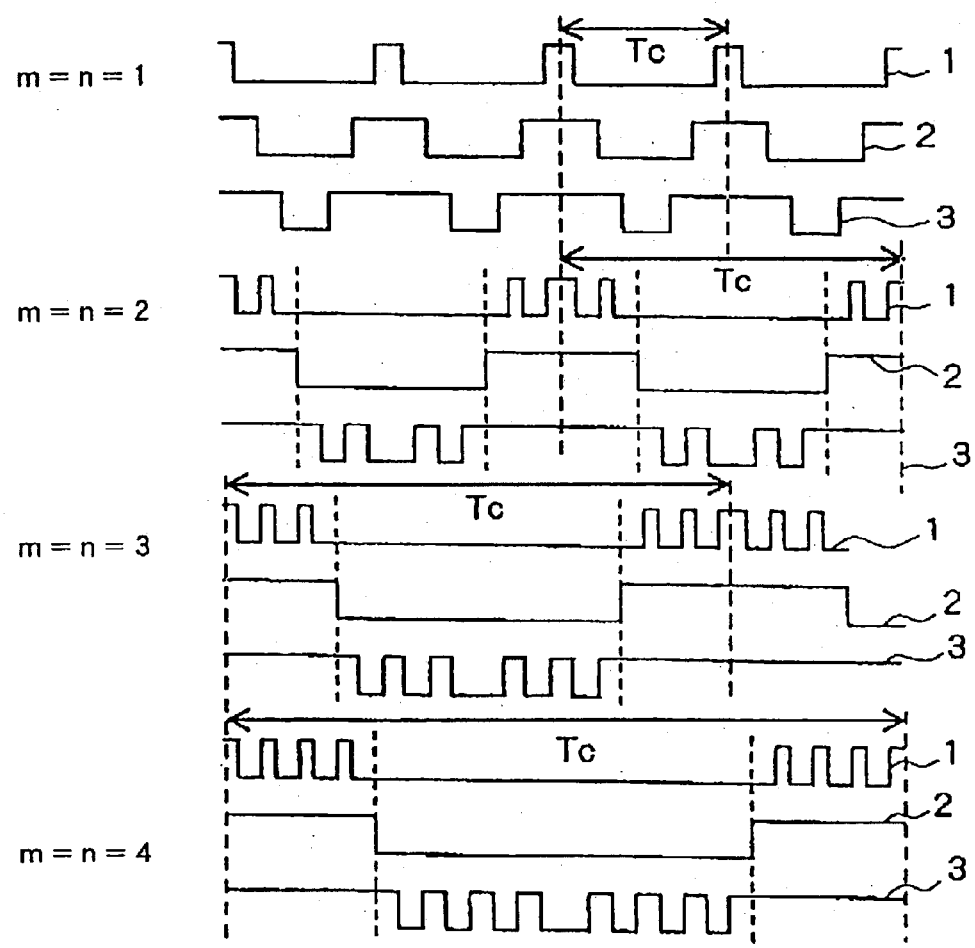
FIG. 9 is a timing chart showing the PWM pulse control method of the first embodiment of the present invention when changing the cycle of the carrier.

As previously described, if the switching intervals become too short due to division of the output times of each vector in this control circuit, the number of divisions m and n of each vector is decreased. However, the PWM pulse control method of the present invention is not limited to this form, and shortness of the switching interval may also be prevented by extending the cycle Tc of triangular wave voltage 4. FIG. 9 is a timing chart showing the PWM pulse control method of the present embodiment when varying cycle Tc of the carrier (triangular wave voltage 4). As shown in FIG. 9, when the switching interval has become excessively short, the cycle Tc of triangular wave voltage 4 is lengthened to lengthen the switching intervals of semiconductor switching elements 103–108.

As described in the foregoing explanation, through the use of the PWM pulse control method of the present embodiment, when both the output frequency of an inverter and the frequency of triangular wave voltage 4 are set low, the output times of the output voltage vectors of each phase within a cycle of triangular wave voltage 4 are divided using first set value m and second set value n to generate PWM pulses 1–3, resulting in difference by phase in the frequency of current ripple, which is a ripple component that arises from PWM pulses 1–3 that are contained in the current that flows to a motor. Since the frequency components of the current ripple that arises from PWM pulses 1–3 can be dispersed, of the frequency components of sound that is produced by the current ripple, the frequency component that is within the spectrum of human hearing can be prevented from reaching a high level.

Second Embodiment

Figure 10:
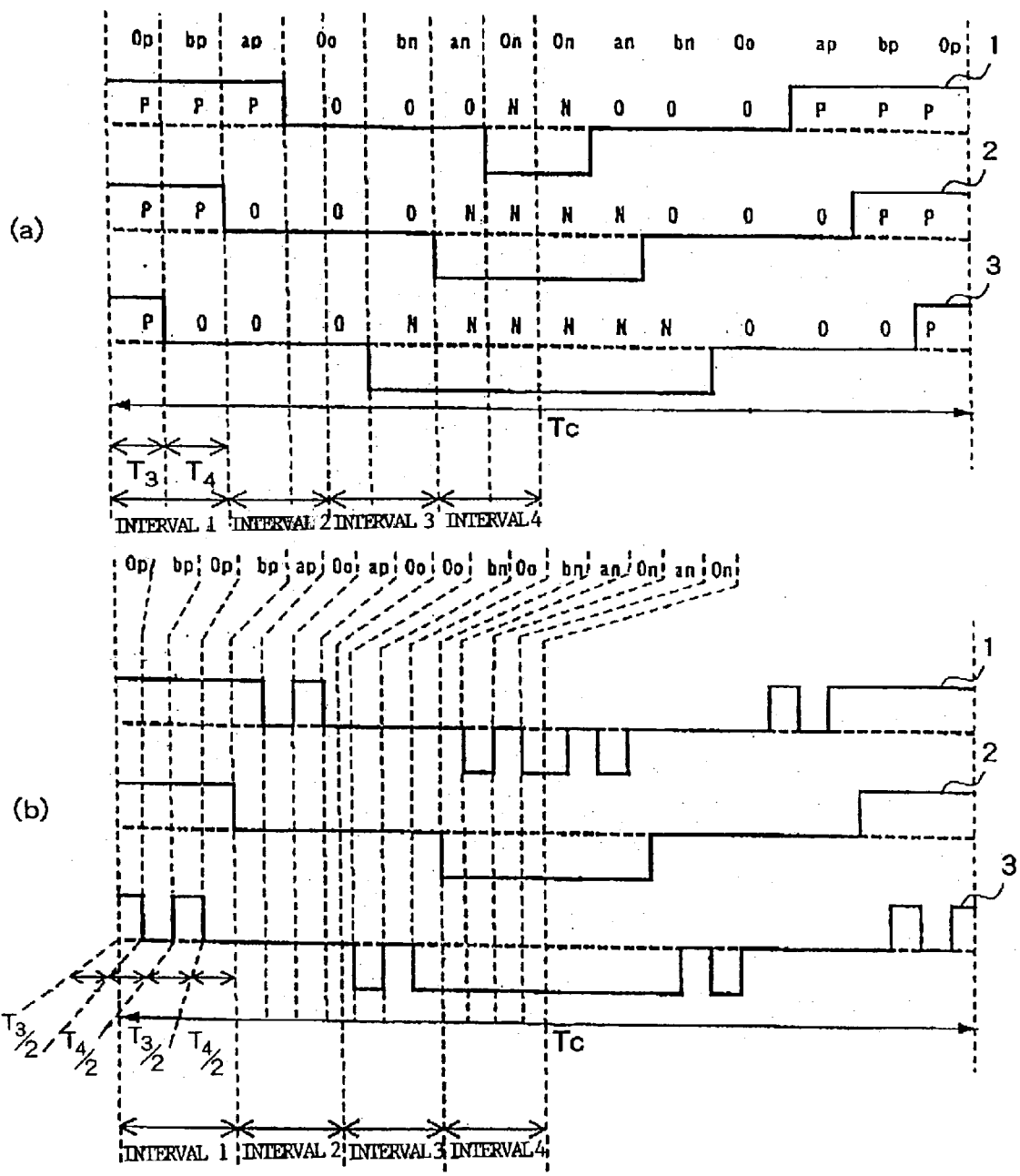
FIG. 10 is a timing chart showing the basic method of the PWM pulse control method of the second embodiment of the present invention.
Figure 11:
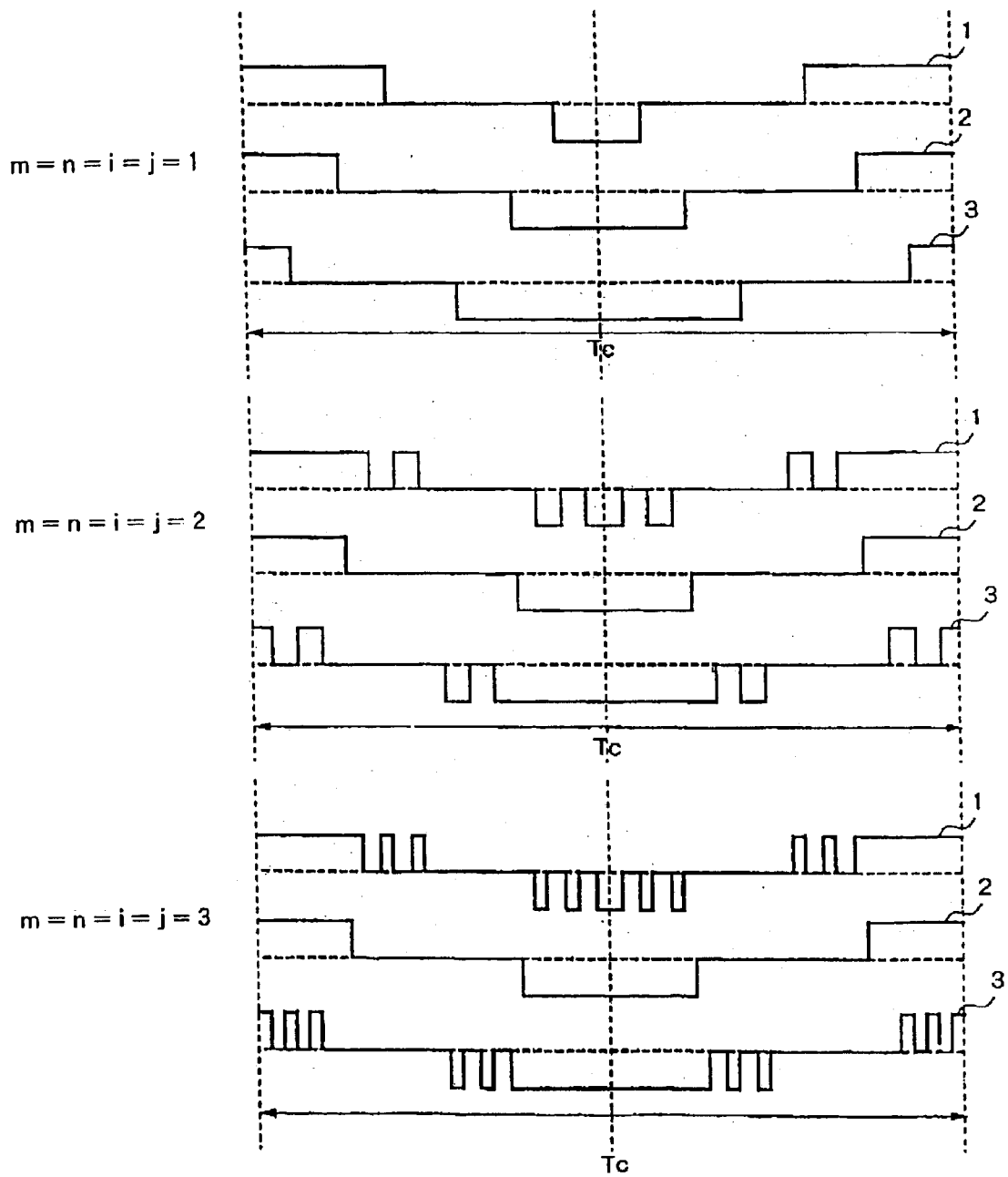
FIG. 11 is a timing chart showing the PWM pulse control method of the second embodiment of the present invention when changing the number of divisions.
Figure 12:
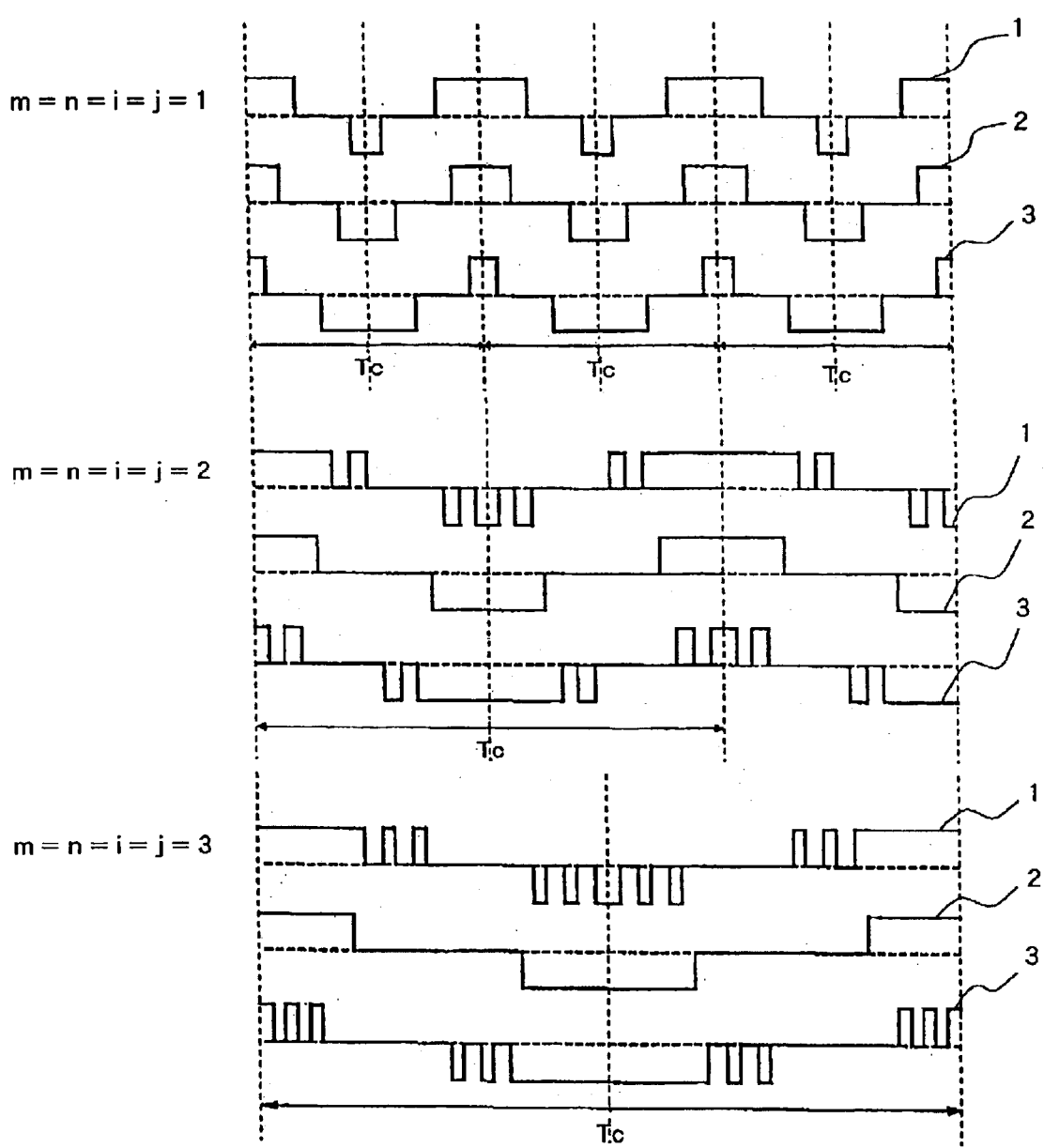
FIG. 12 is a timing chart showing the PWM pulse control method of the second embodiment of the present invention when changing the cycle of the carrier.

We next refer to FIGS. 10–12 to explain the details regarding the PWM pulse control method of the second embodiment of the present invention. The PWM pulse control method of the present embodiment is applied to the three-phase three-level PWM inverter that is shown in FIG.

3, i.e., to a neutral point clamping inverter. With this three-phase three-level PWM inverter, dipolar modulation is adopted when the output frequency and the modulation percentage of the inverter are low.

We first refer to FIG. 10, which is a timing chart showing the basic method of the PWM pulse control method of the present embodiment. In the PWM pulse control method of this embodiment, the output order of each vector and the output times of each vector within one cycle of triangular wave voltage 4 are first found when PWM pulses 1–3 are generated, as with the PWM pulse control method of the prior art.

In the prior-art PWM pulse control method, the output time of each vector is as shown in FIG. 10($a$). As shown in FIG. 10($a$), the output voltage vectors within a cycle of triangular wave voltage 4 undergo transitions in the order Op-vector-bp-vector-ap-vector-Oo-vector-bn-vector-an-vector-On-vector, or in the opposite order.

In the PWM pulse control method of the present embodiment, (Op-vector, bp-vector), (ap-vector, a portion of the Oo vector), (a portion of the Oo-vector, bn-vector) and (an-vector, On-vector) are grouped, and then taking time intervals in which vectors that are in the same groups are successively output as a standard, the output times of each vector are divided within the cycle.

The time interval at the start of a cycle of triangular wave voltage 4 in which the Op-vector and bp-vector are successively output is interval 1, the next time interval in which the ap-vector and a portion the Oo-vector are successively output is interval 2, the next time interval in which the remaining portion of the Oo-vector and the bn-vector are successively output is interval 3, and the next time interval in which the an-vector and On-vector are successively output is interval 4.

In interval 1, the output time of the Op-vector is $T_3$, and the succeeding output time of the bp-vector is $T_4$. In the PWM pulse control method of the present embodiment, the Op-vector is output for the first time $T_{3/2}$ in interval 1, and the bp-vector is output for the succeeding time $T_{4/2}$. The Op-vector is output for the succeeding time $T_{3/2}$, and the bp-vector is output for the final time $T_{4/2}$. In other words, the output time of the Op-vector and the output time of the bp-vector are divided into two divisions with each vector being alternately output twice. The output time of each vector is similarly divided into two divisions for the succeeding intervals 2, 3, 4, and following intervals. In the PWM pulse control method of the present embodiment, the output time of each vector is divided as described above, and PWM pulses 1–3 are generated in which the vectors are alternately output for the resulting divided times, each vector being output a number of times equal to the number of divisions. FIG. 10($b$) shows the resulting PWM pulses of each phase 1–3.

In the PWM pulse control method of the present embodiment, the sum of the widths of PWM pulses 1–3 within one cycle of triangular wave voltage 4 is the same as in the PWM pulse control method of the prior art, and ideally, the output voltage of the inverter should also be the same as the output voltage in the PWM pulse control method of the prior art. In actuality, however, the output voltage of the inverter in the PWM pulse control method of the present embodiment is influenced by the switching characteristics of semiconductor switching elements 230–241 and some difference will therefore be seen with respect to the PWM pulse control method of the prior art. In the PWM pulse control method of the present embodiment, the switching characteristics of semiconductor switching elements 230–241 are taken into consideration and PWM pulses 1–3 are corrected such that the output voltage is the same as in the prior-art PWM pulse control method. This correction of PWM pulses 1–3 is performed by predicting the amount of correction based on the already known switching characteristics of semiconductor switching elements 230–241 and detecting divergence from the actual output voltage of the inverter.

In this PWM pulse control method of the present embodiment, the output time of each vector may be divided into three or four divisions. FIG. 11 is a timing chart showing the PWM pulse control method of the present embodiment when varying the number of divisions. As shown in FIG. 11, in the PWM pulse control method of the present embodiment, the output time of the Op-vector and the output time of the bp-vector within a cycle of triangular wave voltage 4 are divided into m divisions, the output time of the ap-vector and the output time of a portion of the Oo-vector are divided into n divisions, the output time of the remaining portion of the Oo-vector and the output time of the bn-vector are divided into i divisions, and the output time of the an-vector and the output time of the On-vector are divided into j divisions. Although m, n, i, and j are all equal in FIG. 5, m, n, i, and j may all be different values. A positive integer must be designated for each number of divisions, and each number of divisions must be adjusted according to the frequency components of the generated current ripple.

The output times of the Op-vector, Oo-vector, On-vector, ap-vector, an-vector, bp-vector, and bn-vector are determined by the modulation percentage and phase angle of the output voltage vectors that are to be output by the inverter, and these output times fluctuate greatly. For example, when the value of the voltage commands for each phase are close, the output times of the ap-vector, an-vector, bp-vector, and bn-vector become short. If the switching intervals of semiconductor switching elements 230–241 become too short when these output times are divided and switching cannot be performed effectively, the numbers of divisions m, n, i, and j are decreased to prevent the switching intervals of semiconductor switching elements 230–241 from becoming too short.

Further, when the switching intervals become too short due to the division of the output times of each vector in the PWM pulse control method of the present embodiment, cycle Tc of triangular wave voltage 4 may also be extended. FIG. 12 is a timing chart showing the PWM pulse control method of the present embodiment when varying cycle Tc of the carrier (triangular wave voltage 4). As shown in FIG. 12, when the switching intervals become too short, cycle Tc of triangular wave voltage 4 is modified to an appropriate length to lengthen the switching intervals of semiconductor switching elements 230–241.

As previously explained, through the use of the PWM pulse control method of the present embodiment, when the output frequency of the inverter and the frequency Tc of triangular wave voltage 4 are both set low, the output times of the output voltage vectors of each phase in the cycle of triangular wave voltage 4 are divided using first, second, third, and fourth set values to generate PWM pulses 1–3, resulting in difference by phase in the frequency of current ripple, which is a ripple component that arises from PWM pulses 1–3 that are contained in the current that flows to the motor. As a result, the frequency component of the current ripple that arises from PWM pulses 1–3 can be dispersed and, of the frequency components of sound that is produced by the current ripple, the frequency component that is within the spectrum of human hearing can be prevented from reaching a high level.

Further, although the generation times of each vector were divided into equal divisions in the first and second embodiments of the PWM pulse control method, the frequency component of current ripple that flows to a motor can also be adjusted without dividing these generation times into equal divisions, i.e., by dividing these generation times into divided times having variations. Adopting this form enables greater dispersion of the frequency components of current ripple and enables further reduction of frequency components that are within the spectrum of human hearing among the frequency components of sound that is produced by current ripple.

Further, in the PWM pulse control method of this embodiment, as with the PWM pulse control method of the first embodiment, the ability to correct by means of ON-delay correction amounts will be readily understood by a person skilled in the art. In the PWM pulse control method of the present embodiment, moreover, first to fourth dividing values m-j are used in dividing each vector, and the ON-delay correction amounts are therefore determined based on the first to fourth division values m-j.

Finally, in the PWM pulse control method of the present embodiment, it will also be readily understood by a person skilled in the art that the determination of the actual number of divisions and divided times of vectors that are shown in Steps 1004–1005 and Steps 1007–1009 of FIG. 8 is performed successively for all dividing values m-j.

Third Embodiment

Figure 13:
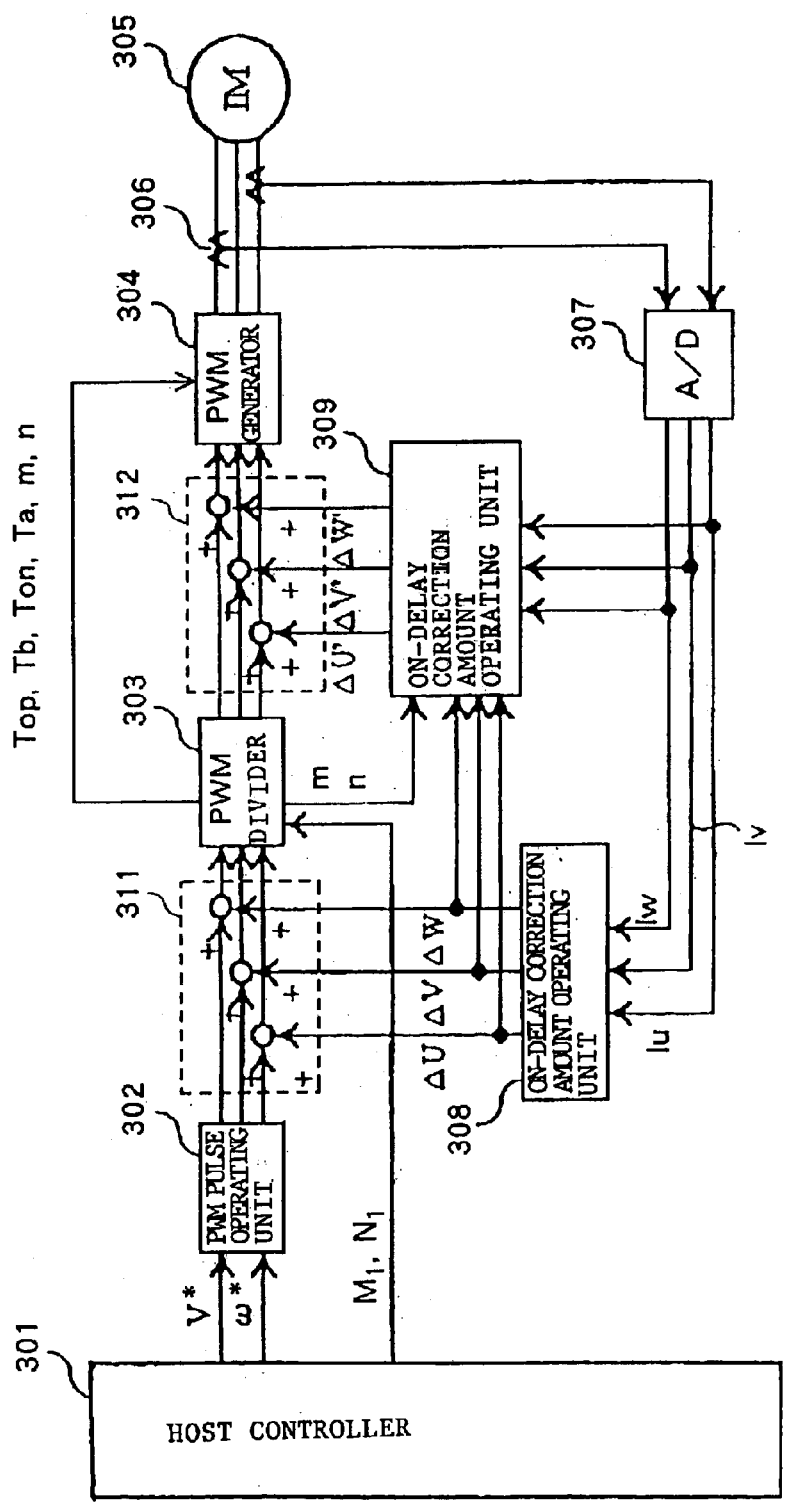
FIG. 13 is a block diagram showing the construction of the control circuit of an induction motor that uses the PWM pulse control method of the first embodiment of the present invention.
Figure 14:
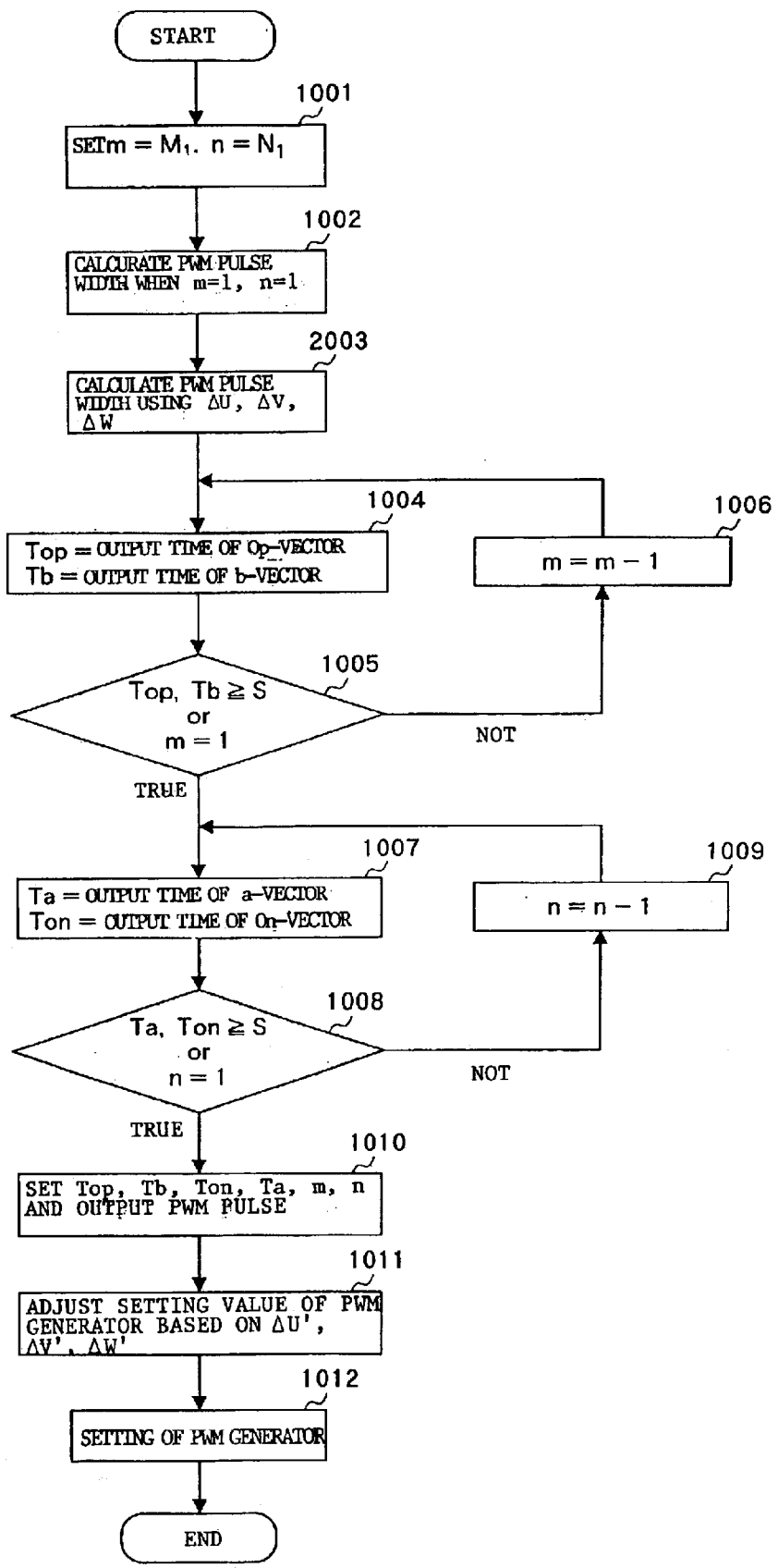
FIG. 14 is a flow chart showing the operation of the control circuit shown in FIG. 13.

We next refer to FIGS. 13 and 14 to explain the PWM pulse control method of the third embodiment of the present invention. FIG. 7 and FIG. 8 shows the control circuit of induction motor 305 that employs the PWM pulse control method of the first embodiment and its operation. In this control circuit, however, ON-delay correction amounts Δ U", Δ V", and Δ W" that are output from ON-delay correction amount operating unit 310 are ON-delay correction amounts when first set value m and second set value n are initial values $M_1$ and $N_1$, respectively.

As previously explained, ON-delay correction amounts are determined by the product of the ON-delay time necessary for switching a semiconductor switching element one time and the number of instances of switching, and since the number of instances of switching is determined according to the number of divisions of each vector, the addition of ON-delay correction amounts that are determined by means of initial values $M_1$ and $N_1$ without modification to PWM pulses 1–3 results in ON-delay correction amounts that exceed the ideal ON-delay correction amounts, i.e., results in overcompensation, when initial values $M_1$ and $N_1$ are greater than first set value m and second set value n that are the actual number of divisions of vectors. This overcompensation may generate even greater distortion in the output current of the inverter. Overcompensation of the ON-delay compensation amount is therefore prevented in the PWM pulse control method of the present embodiment.

FIG. 13 is a block diagram showing the configuration of the control circuit of an induction motor that employs the PWM pulse control method of the present embodiment. As shown in FIG. 13, the control circuit of induction motor 305 that employs the PWM pulse control method of the present embodiment differs from the control circuit of FIG. 7 in that it is provided with ON-delay correction amount operating unit 308 in place of ON-delay correction amount operating unit 310 and is additionally provided with ON-delay correction amount operating unit 309 and adder 312.

ON-delay correction amount operating unit 308 receives as input current values of each phase $I_u$, $I_v$, and $I_w$ of induction motor 305 that have been output from A/D converter 307 and calculates and outputs first ON-delay correction amounts of each phase Δ U, Δ V, and Δ W when first set value m and second set value n are 1.

ON-delay correction amount operating unit 309 receives as input finally the determined first set value m and second set value n that are actually used in the division of each vector from PWM divider 303; current values of each phase $I_u$, $I_v$, and $I_w$ of induction motor 305 that are output from A/D converter 307; and first ON-delay correction amounts Δ U, Δ V, and Δ W that are output from ON-delay correction amount operating unit 308; and calculates and outputs second ON-delay correction amounts of each phase Δ U', Δ V', and Δ W'.

The positive or negative attribute of the second ON-delay correction amounts of each phase Δ U', Δ V', and Δ W' is determined by the direction of current values of each phase $I_u$, $I_v$, and $I_w$ of induction motor 305, and the magnitudes of these ON-delay correction amounts are values obtained by subtracting the first ON-delay correction amounts of each phase Δ U, Δ V, and Δ W from the product of the ON-delay time that is necessary for switching a semiconductor switching element one time and the number of instances of switching of semiconductor switching elements of each phase according to set values m and n.

Adder 312 adds second ON-delay correction amounts of each phase Δ U', Δ V', and Δ W' to PWM pulses 1–3 that have been output from PWM divider 303 to adjust the width of PWM pulses of each phase 1–3 of induction motor 105 in one cycle of PWM and outputs the result.

FIG. 14 is a flow chart for a case of implementing the PWM pulse control method of the present embodiment using the control circuit of induction motor 105 of FIG. 13.

As shown in FIG. 14, the PWM pulse control method of the present embodiment differs from the PWM pulse control method shown in the flow chart of FIG. 8 in that a Step 2003 is carried out in place of Step 1003 and a Step 1011 is carried out between Step 1010 and Step 1012. In Step 2003, PWM pulses of each phase 1–3 for each PWM cycle that have been calculated by PWM pulse operating unit 302 are added by adder 111 to first ON-delay correction amounts of each phase Δ U, Δ V, and Δ W that have been output from ON-delay correction amount operating unit 308, whereby the widths of PWM pulses 1–3 are adjusted. As previously described, the values that are output from ON-delay correction amount operating unit 108 are the ON-delay correction amounts of each phase Δ U, Δ V, and Δ W when first set value m and second set value n are 1.

Finally, in Step 1011, ON-delay correction amounts of each phase Δ U', Δ V', and Δ W' of PWM pulses 1–3 that are output from ON-delay correction amount operating unit 309 are added by adder 311 to the output times of each vector that have been output from PWM divider 303 to adjust the pulse widths of PWM pulses of each phase 1–3 of induction motor 305 in one cycle of PWM, and these results are output.

As described hereinabove, in the PWM pulse control method of the present embodiment, first ON-delay correction amounts Δ U, Δ V, and Δ W are calculated with first set value m and second set value n as 1;

the divided times of each vector are found by PWM divider 303 for PWM pulses 1–3 that have been corrected by first ON-delay correction amounts Δ U, Δ V, and Δ W;

second ON-delay correction amounts Δ U', Δ V', and Δ W' are calculated, these amounts being obtained by subtracting first ON-delay correction amounts Δ U, Δ V, and Δ W from values that have been calculated based on first set value m and second set value n that have been finally determined by means of PWM divider 303; and PWM pulses that have been corrected by first ON-delay correction amounts Δ U, Δ V, and Δ W are further corrected by second ON-delay correction amounts Δ U', Δ V', and Δ W'.

In the PWM pulse control method of the present embodiment, the total ON-delay correction amounts of the PWM pulses are the sums of first ON-delay correction amounts Δ U, Δ V, and Δ W, which are ON-delay correction amounts that are calculated based on first set value m and second set value n that have been finally determined, and second ON-delay correction amounts Δ U', Δ V', and Δ W'. The PWM pulse control method of the present embodiment therefore enables ON-delay correction of PWM pulses 1–3 that accords with the actual number of divisions of each vector m and n and that is free of overcompensation. The PWM pulse control method of the present embodiment therefore enables correction of distortion, without overcompensation or undercompensation, in the output current of an inverter that arises from ON-delay.

Further, because the division of PWM pulses in the PWM pulse control method of the present embodiment is carried out based on PWM pulses to which first ON-delay correction amounts Δ U, Δ V, and Δ W have been added, the division of PWM pulses 1–3 can be performed using PWM pulses 1–3 that approximate the PWM pulses that are actually output to the inverter.

Although first ON-delay correction amounts Δ U, Δ V, and Δ W that are calculated with first set value m and second set value n as 1 are added to PWM pulses 1–3 and second ON-delay correction amounts Δ U', Δ V', and Δ W', which are values obtained by subtracting first ON-delay correction amounts Δ U, Δ V, and Δ W from values that are calculated based on the finally determined first set value m and second set value n, are further added to PWM pulses 1–3 in the PWM pulse control method of the present embodiment, the PWM pulse control method of the present invention is not limited to this form, and the entire ON-delay correction amounts that are added to PWM pulses 1–3 may also be only values that are calculated based on first set value m and second set value n that have been finally determined by PWM divider 303.

Further, even when PWM generator 304 of the present embodiment is not a three-phase two-level PWM inverter but rather, a three-phase three-level PWM inverter as in the PWM pulse control method of the second embodiment, the capacity to prevent overcompensation of the ON-delay compensation amounts as in the PWM pulse control method of the present embodiment will be readily apparent to one skilled in the art. The division of each of the vectors in such a case is performed by means of first to fourth dividing values m-j, and both first ON-delay correction amounts Δ U, Δ V, and Δ W and second ON-delay correction amounts are therefore determined based on first to fourth dividing values m-j, first ON-delay correction amounts Δ U, Δ V, and Δ W being determined with first to fourth dividing values m-j as 1 and second ON-delay correction amounts Δ U', Δ V', and Δ W' being determined based on the actual values of first to fourth dividing values m-j.

Finally, in the PWM pulse control method of the present embodiment, it will also be readily understood by one skilled in the art that the determination of the actual number of divisions and the dividing times of each vector as shown in Steps 1004–1005 and Steps 1007–1009 of FIG. 14 is performed successively for all dividing values m-j.

What is claimed is:

1. A PWM pulse control method of a three-phase two-level inverter, said PWM pulse control method comprising steps of:

defining the state of a phase of a load as a first state when an output terminal of said phase is connected to a positive bus that leads from the positive electrode side of a dc power supply;

defining the state of said phase as a second state when said output terminal is connected to a negative bus that leads from the negative electrode side of said dc power supply;

defining an output voltage vector in which the output states of all phases are said first state as an Op-vector;

defining an output voltage vector in which the output states of all phases are said second state as an On-vector;

defining an output voltage vector in which the output state of one of the phases is said first state and the output states of the other two phases are said second state as an a-vector;

defining an output voltage vector in which the output state of one of the phases is said second state and the output states of the other two phases are said first state as a b-vector;

for a first interval in which said Op-vector and said b-vector are successively output within a cycle of a PWM carrier signal, dividing the output time of each vector in said first interval by a first set value, which is a positive integer, to find divided times of each vector;

alternately outputting said Op-vector and said b-vector, each time for exactly the time interval of said divided times, each vector being output the number of times that has been established as said first set value;

for a second interval in which said On-vector and said a-vector are successively output within said cycle, dividing the output time of each vector in said second interval by a second set value, which is a positive integer, to find divided times of each vector;

alternately outputting said On-vector and said a-vector, each time for exactly the time interval of said divided times, each vector being output the number of times that has been established as said second set value; and generating PWM pulses based on the divided times of each output vector.

2. A PWM pulse control method according to claim 1, further comprising a step of:

making said first set value and said second set value values that are smaller than the currently set values when said divided times are shorter than a prescribed time.

3. A PWM pulse control method according to claim 2, further comprising steps of:

calculating first ON-delay correction amounts in which said first set value and said second set value are calculated as 1;

finding divided times of each of said vectors for PWM pulses that have been corrected by said first ON-delay correction amounts;

calculating second ON-delay correction amounts, which are values obtained by subtracting said first ON-delay correction amounts from values that were calculated based on said first set value and said second set value that were determined when finding each of said divided times; and further correcting the correction of PWM pulses that were corrected by means of said first ON-delay correction amounts by means of said second ON-delay correction amounts.

4. A PWM pulse control method according to claim 2, further comprising a step of defining, as the ON-delay correction amounts of PWM pulses, values that are calculated based on said first set value and said second set value that were determined when finding each of said divided times.

5. A PWM pulse control method according to claim 1, further comprising a step of making the cycle of said PWM carrier signal longer than the current cycle with increase in said first and second set values.

6. A PWM pulse control method according to claim 2, further comprising a step of making the cycle of said PWM carrier signal longer than the current cycle with increase in said first and second set values.

7. A PWM pulse control method according to claim 3, further comprising a step of making the cycle of said PWM carrier signal longer than the current cycle with increase in said first and second set values.

8. A PWM pulse control method according to claim 4, further comprising a step of making the cycle of said PWM carrier signal longer than the current cycle with increase in said first and second set values.

9. A PWM pulse control method of a three-phase neutral-point clamping inverter, said PWM pulse control method comprising steps of:

defining the state of a phase of a load as a first state when an output terminal of said phase is connected to a positive bus that leads from the positive electrode side of a dc power supply;

defining the state of said phase as a second state when said output terminal is connected to a negative bus that leads from the negative electrode side of said dc power supply;

defining the state of said phase as a third state when said output terminal is connected to a neutral point;

defining an output voltage vector in which the output states of all phases are said first state as an Op-vector;

defining an output voltage vector in which the output states of all phases are said second state as an On-vector;

defining an output voltage vector in which the output states of all phases are said third state as an Oo-vector;

defining an output voltage vector in which the output state of one of the phases is said first state and the output states of the other two phases are said third state as an ap-vector;

defining an output voltage vector in which the output state of one of the phases is said third state and the output states of the other two phases are said second state as an an-vector;

defining an output voltage vector in which the output state of one of the phases is said third state and the output states of the other two phases are said first state as a bp-vector;

defining an output voltage vector in which the output state of one of the phases is said second state and the output states of the other two phases are said third state as a bn-vector;

for a first interval in which said Op-vector and said bp-vector are successively output within a cycle of a PWM carrier signal, dividing the output times of each vector in said first interval by a first set value, which is a positive integer, to find the divided times of each vector;

alternately outputting said Op-vector and said bp-vector for exactly the time interval of said divided times, each vector being output the number of times that has been established as said first set value; for a second interval in which said ap-vector and said Oo-vector are successively output within said cycle, dividing the output times of each vector in said second interval by a second set value, which is a positive integer, to find the divided times of each vector;

alternately outputting said ap-vector and said Oo-vector for exactly the time interval of said divided times, each vector being output the number of times that has been established as said second set value;

for a third interval in which said Oo-vector and said bn-vector are successively output within said cycle, dividing the output times of each vector in said third interval by a third set value, which is a positive integer, to find the divided times of each vector;

alternately outputting said Oo-vector and said bn-vector for exactly the time interval of said divided times, each vector being output the number of times that has been established as said third set value; for a fourth interval in which said an-vector and said On-vector are successively output within said cycle, dividing the output times of each vector in said fourth interval by a fourth set value, which is a positive integer, to find the divided times of each vector;

alternately outputting said an-vector and said On-vector for exactly the time interval of said divided times, each vector being output the number of times that has been established as said fourth set value; and generating PWM pulses based on the divided times of each of the output vectors.

10. A PWM pulse control method according to claim 9, further comprising a step of setting values that are less than the currently set values for said first, second, third, and fourth set values when said divided times are shorter than a prescribed time.

11. A PWM pulse control method according to claim 10, further comprising steps of:

calculating first ON-delay correction amounts that are calculated with said first, second, third, and fourth set values as 1;

finding divided times of each of said vectors for PWM pulses that have been corrected by means of said first ON-delay correction amounts;

calculating second ON-delay correction amounts, which are values obtained by subtracting said first ON-delay correction amounts from values that were calculated based on said first, second, third, and fourth set values that were determined when finding each of said divided times; and further correcting the correction of PWM pulses that were corrected by means of said first ON-delay correction amounts by means of said second ON-delay correction amounts.

12. A PWM pulse control method according to claim 11, further comprising a step of defining, as ON-delay correction amounts of PWM pulses, values that are calculated based on said first, second, third, and fourth set values that were determined when finding each of said divided times.

13. A PWM pulse control method according to claim 9, further comprising a step of making the cycle of said PWM carrier signal longer than the current cycle with increase in said first, second, third, and fourth set values.

14. A PWM pulse control method according to claim 10, further comprising a step of making the cycle of said PWM carrier signal longer than the current cycle with increase in said first, second, third, and fourth set values.

15. A PWM pulse control method according to claim 11, further comprising a step of making the cycle of said PWM carrier signal longer than the current cycle with increase in said first, second, third, and fourth set values.

16. A PWM pulse control method according to claim 12, further comprising a step of making the cycle of said PWM carrier signal longer than the current cycle with increase in said first, second, third, and fourth set values.

* * * * *